INVENTOR.
John D. Hague,
BY H. H. Locke Att'ys.

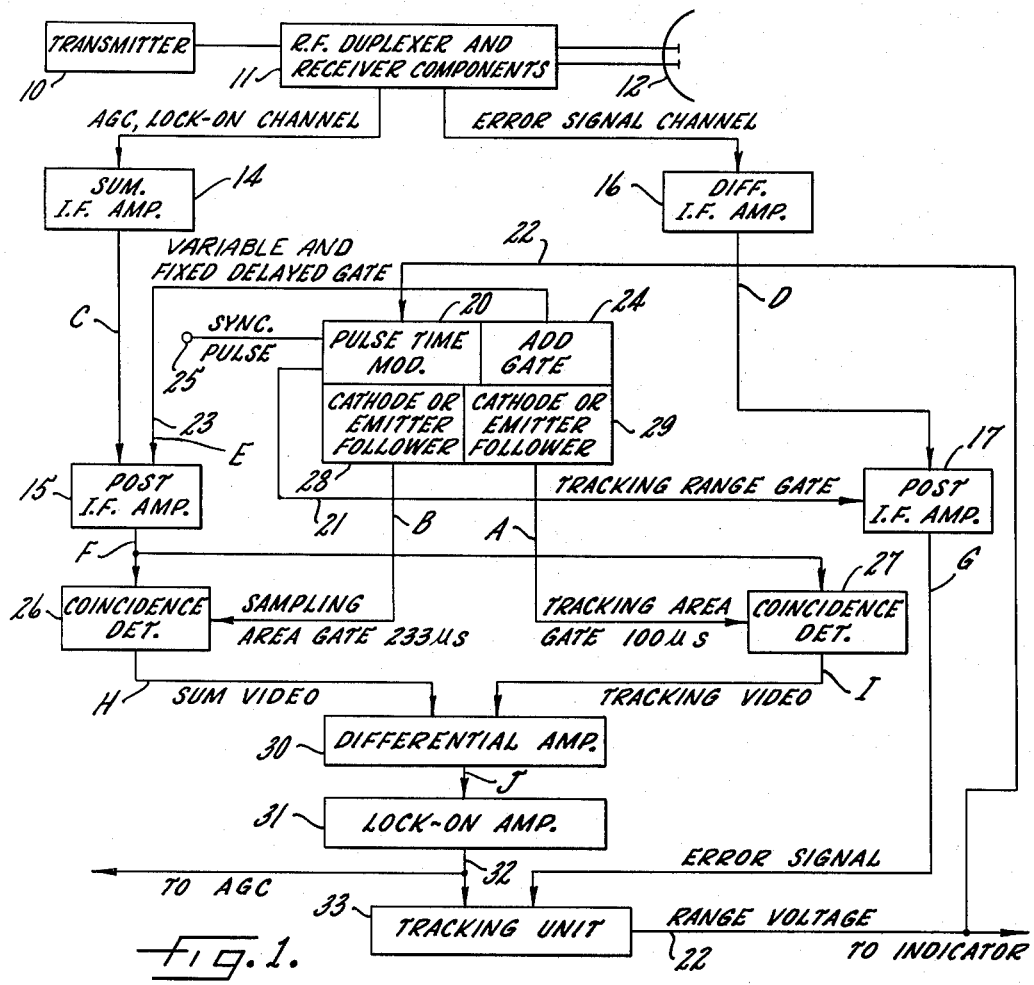
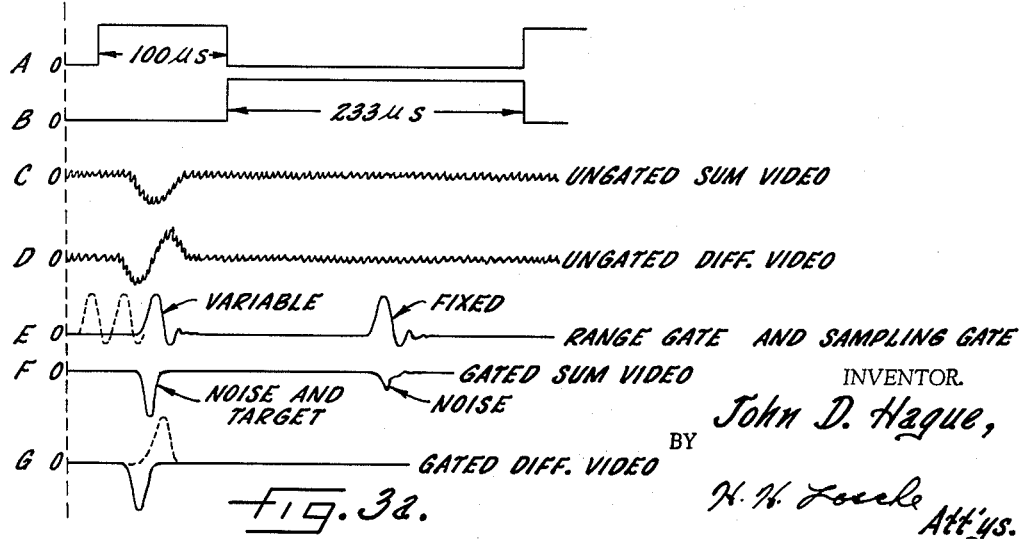
Fig. 1.
Fig. 3a.
INVENTOR.
John D. Hague,

United States Patent Office 3,249,934
Patented May 3, 1966

3,249,934
AUTOMATIC LOCKON CIRCUIT FOR TWO LOBE MONOPULSE AIR-TO-GROUND TRACKING RADAR
John D. Hague, 6122 Carrollton, Indianapolis, Ind.
Filed Mar. 18, 1964, Ser. No. 353,006
10 Claims. (Cl. 343—7.3)

The invention described herein may be manufactured and used by or for the Government of the United States of America for governmental purposes without the payment of any royalties thereon or therefor.

This invention relates to radar target lockon circuits for target tracking in multilobe monopulse air-to-ground radar and more particularly to a lockon circuit having an additional gating means to gate through receiver noise signals only which are automatically compared with gated target plus receiver noise signals to produce an amplified lockon signal whenever the target plus noise signals exceed the noise signals in amplitude regardless of changes in circuit parameters of the receiver.

As presently known, the single gate tracking system is utilized on all monopulse radar systems. This single gate is applied to both the sum and difference channels, usually at the intermediate frequency (IF) level. The gated video from the difference channel is utilized for tracking sense, while the gated video from the sum channel is utilized for automatic gain control (AGC) reference and, more primarily, for lockon triggering.

The typical airborne radar tracking system is made up of two closed loop systems, one being the tracking loop and the other being the lockon loop. There are many circuit parameters in the lockon loop which are likely to change from day to day or during a single flight. For example, the intermediate frequency gain may change due to the operating temperature of the radar equipment, causing resistors to change value and voltages to change. The IF gain will also change, in time, due to degradation of vacuum tubes in the IF strips and due to vibration of controls throughout the radar system which can and do affect the amount of IF gain. When the gain changes, obviously, the IF noise level will change.

The lockon amplifier itself is basically a series mechanized direct current (D.C.) amplifier. D.C. amplifiers always have drift problems. The present application of these D.C. amplifiers is such that a small amount of drift can be tolerated with no adverse effect. The present input stage to the D.C. amplifier series is a differential amplifier with common cathodes and a grounded single grid which provides gain stabilization for the input amplifier. However, due to the fact that most users of the radar wish to get the maximum lockon sensitivity, the majority of the radar systems are adjusted just at the threshold level in the field. Any thermal or shot noise, any voltage transients in the system, any D.C. amplifier drift, and any change in noise level will significantly reduce lockon capability or cause forced lockon which precludes any reasonable operation of the automatic air-to-ground function.

In this invention the novel circuitry and the additional gating means eliminate or greatly reduce the interaction effects of many related parameters in the radar system in the operation of the air-to-ground range circuits. In addition to the single range tracking gate previously used in the tracking circuits of the radar the fixed gate is provided at a range which is likely to be beyond the tracking range of the radar. Generally this fixed gate will see only receiver noise. If the output of this additional or fixed gate is compared continuously with the output of the original range tracking gate and lockon is established only when the output of the original tracking gate exceeds the output of the fixed or sample gate, very stable operation of the lockon and the tracking circuits can be accomplished. It is therefore a general object of this invention to provide the lockon loop of a multilobe monopulse air-to-ground radar tracking loop with an additional gate and sampling area gating means to gate beyond the normal range of the range tracking gate and to continuously and automatically compare the outputs of these two gates to produce a lockon signal whenever a signal in the tracking gate exceeds the signals in the sample area or additional gate.

These and other objects and the attendant advantages, features, and uses will become more apparent to those of ordinary skill in the art when considered along with the accompanying drawings in which:

FIGURE 1 is a block schematic diagram of a two-lobe monopulse radar transmitter and receiver system with the lockon and tracking loops shown in block circuit schematic;

FIGURE 3a is a view of related waveforms occurring at various terminals or points in FIGURE 1.

Figure 2:
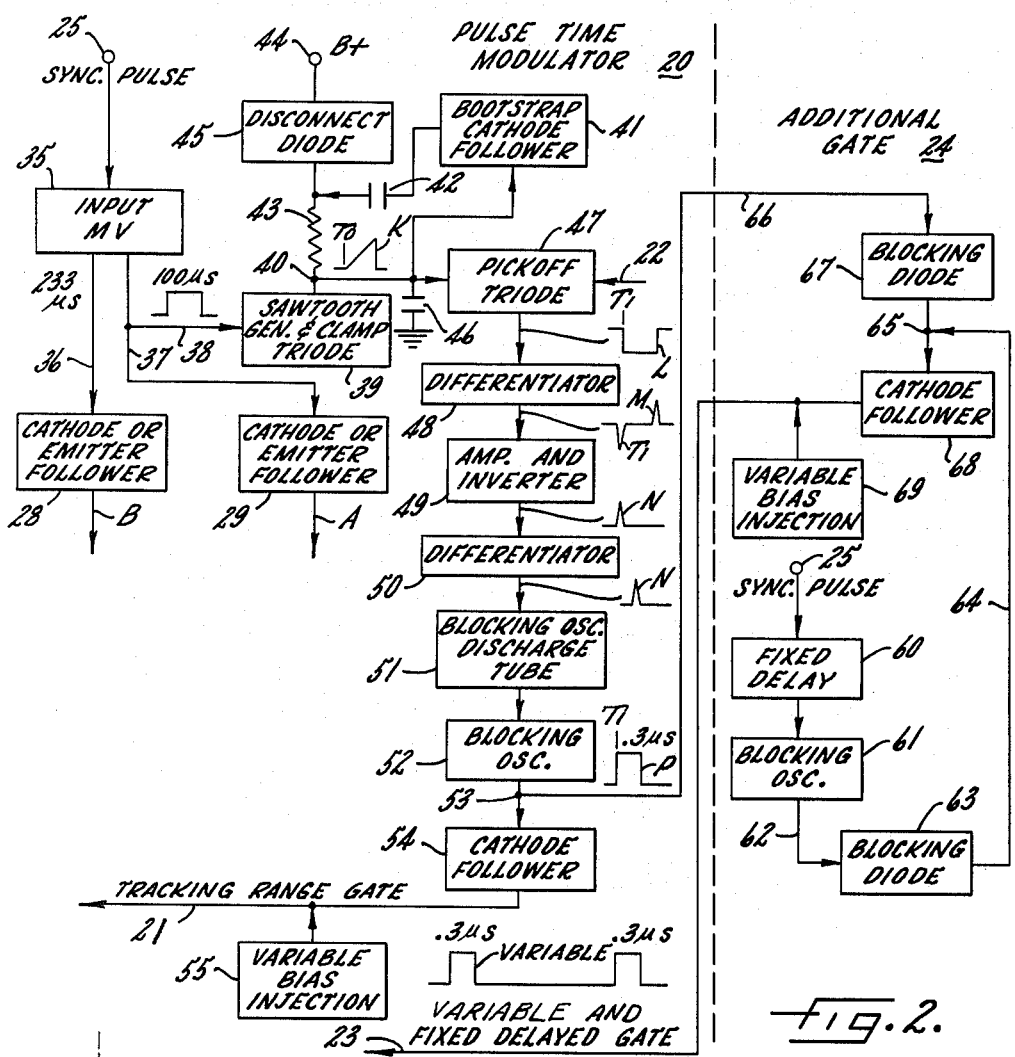
FIGURE 2 is a block circuit schematic diagram of the pulse time modulator and related blocks in FIGURE 1.

Referring more particularly to FIGURE 1 of the drawing there is illustrated a two-lobe monopulse radar (although a four-lobe monopulse could be used and illustrated as well) having a transmitter 10, a radio frequency (RF) duplexer and receiver components shown in block 11, and a coupled two-lobe antenna 12. The receiver components of the RF duplexer 11 provide two channel outputs, one being the sum channel and the other the difference channel. The sum channel has a sum IF amplifier 14 in series with a post IF amplifier 15, while the difference channel has in series a difference IF amplifier 16 and a post IF amplifier 17. This two-lobe monopulse radar system thus described is of a conventional type known to those skilled in the art as may be seen in the text, "Introduction to Radar Systems," by Merrill I. Skolnik (1962), section 5.4, published by the McGraw-Hill Book Company, Incorporated. It is recognized and understood by those skilled in the art that the sum channel provides the AGC and lockon circuitry while the difference channel provides the error signal for the tracking loop. Some radar automatic range tracking systems utilize time modulators to range gate the signal channels of the radar by range gating the second detector as shown in the text, "Airborne Radar Principles of Guided Missile Design," by Grayson Merrill (1961) section 9–11, published by the Van Nostrand Company, Incorporated. Such radar systems may likewise be gated by a pulse time modulator in one of the IF amplifiers of the IF amplifier strip.

In the present invention a pulse time modulator 20 is coupled by the conductor means 21 to gate the post IF amplifier 17 in the difference channel. The pulse time modulator 20 provides a tracking range gate signal on the output conductor 21 which varies in time in accordance with a range voltage applied to the pulse time modulator by way of the input 22, this range voltage input being developed in a manner later to be described to produce a variable range gating voltage on the output conductor 21, similar to that shown by the variable gating pulse of waveform E in FIGURE 3a. The gating pulse, providing the tracking range gate over the conductor 21, gates the post amplifier 17 to amplify target signal D coming from the difference IF amplifier 16. The ungated sum and difference waveforms C and D are shown in FIGURE 3a. Along with the first input C to the post IF amplifier 15 in the summing channel is a second input of a fixed and delayed gate pulse and the tracking range gate as shown by the fixed pulse and the variable pulse, in the waveform E of FIGURE 3a conducted by way of conductor means 23 from an additional gating means 24 attached to the block pulse time modulator 20. The pulse time modulator 20 and the additional gate 24 will be more fully described in detail in the description of FIGURE 2. The pulse time modulator 20 and the additional fixed gate 24 are triggered by synchronous pulses from the radar, the synchronous pulses being applied to the terminal 25, as will be made clear later in the description of FIGURE 2. Suffice it to mention at this point in the description that the additional gate relays each synchronous pulse applied at 25 by such a time interval that the fixed pulse of waveform E, in FIGURE 3a is beyond the normal range of the radar system. The additional fixed gating pulse of waveform E, applied by way of conductor means 23 to the post IF amplifier 15, will accordingly amplify receiver noise only at this gated time interval. The gating pulses applied over conductor means 23 will gate the post IF amplifier 15 to amplify both receiver noise and target signals at the time of the variable gating pulse or tracking gate and will amplify receiver noise at the time interval of the fixed gate to produce on the output F the waveform F, as shown in FIGURE 3a. The output F from the post IF amplifier 15 is applied as an input to each of two coincidence detectors 26 and 27 providing two subchannels of the sum channel. As a second input to the coincidence detector 26 a sampling area gating pulse B, as shown in FIGURE 3a, is applied from the pulse time modulator through a cathode or emitter follower circuit 28. In like manner, the coincidence detector 27 has a second input, being the output A of a voltage waveform A as shown in FIGURE 3a from the pulse time modulator through a cathode or emitter follower 29. As will be made clear in the description of FIGURE 2, the tracking area gating signal A is of about 100 microseconds in duration while the sampling area gating signal B is of about 233 microseconds duration for each gating cycle of 333 microseconds. The coincidence detectors 26 and 27 include coincidence circuitry to produce a voltage signal when there is coincidence between the target and/or noise signals within the gating pulse A or B, this voltage signal being detected by a direct current type of detector which establishes a direct current voltage level proportional to the amplitude of the voltage signal as a direct current restorer shown and described in the text of Massachusetts Institute of Technology, Radiation Laboratory Series, by Lewis N. Ridenour, volume 18, 1948, first edition on "Vacuum Tube Amplifiers," published by McGraw-Hill Book Company, Incorporated. Since the tracking area gate A of 100 microseconds occurs during the period of time that a target echo can be expected for the radar system, the coincidence gate 27 will be enabled to detect and pass any target signal with receiver noise signals such as C, in FIGURE 3a, to the output I as a direct current voltage proportional to the amplitude of the target and noise signals, as shown by the waveform I in FIGURE 3b. The sampling area gate B of 233 microseconds is applied to the coincidence detector 26 following the 100-microsecond tracking area gate signal to enable coincidence gate 26 to pass noise frequencies amplified by the post IF amplifier 15 during the period of the fixed gate to produce the direct current signal H as shown in FIGURE 3b on the output H of the coincidence detector 26 proportional to the noise voltage amplitude. The output H provides the gated sum video noise voltage signals proportional to the noise voltage amplitude and the output I provides the gated sum tracking target video and noise signals proportional to target and noise voltage amplitude, as shown by H and I in FIGURE 3b.

The output of the coincidence detectors 26 and 27 are applied as two inputs to a relatively low gain differential amplifier 30. If there is no target signal present in the radar target tracking system, the sum tracking video signal I and the sum video sampling signal H applied to differential amplifier 30 will be equal, or nearly so, at which time the output J of the differential amplifier will be close to zero, as shown by the top waveform condition of J in FIGURE 3b. If the sum video sampling gate output H is of greater amplitude than the sum tracking video output H is of greater amplitude than the sum tracking video output I to the differential amplifier 30, the output J will be negative by a small amplitude, as shown by the next lower J signal waveform in FIGURE 3b with the legend "target in sampling gate only." If, however, the sum tracking video signal I is greater than the sum video sampling signal H to the differential amplifier 30, the output J will be positive going at a relatively high amplitude, as shown by the waveform of J in FIGURE 3b with the legend "target in tracking gate primarily." The lockon output signal voltage J is applied to a lockon amplifier 31 which is basically a D.C. amplifier that will amplify any positive going signal applied from the differential amplifier 30. The output of the lockon amplifier 31 is applied by conductor 32 to the radar tracking unit 33 and also the AGC circuits (not shown) of the radar system. To the tracking unit 33 also is applied the error signal G coming as an output of the post amplifier 17 in the difference channel. The error signal G, as shown by G in FIGURE 3a, being positive or negative in accordance with the positive or negative swings of the intermediate signal D, is applied from the IF post amplifier 17 to the tracking unit 33. The tracking unit produces the range voltage on the output 22 from the error tracking signal G and the target tracking signal J applied thereto, the range voltage being conducted by way of the conductor means 22 to the pulse time modulator to vary the gating signal E in accordance with the range of an illuminated target. The range voltage on 22 likewise may be conducted to an indicator of the radar system, as well understood by those skilled in the radar art.

Figure 3B:
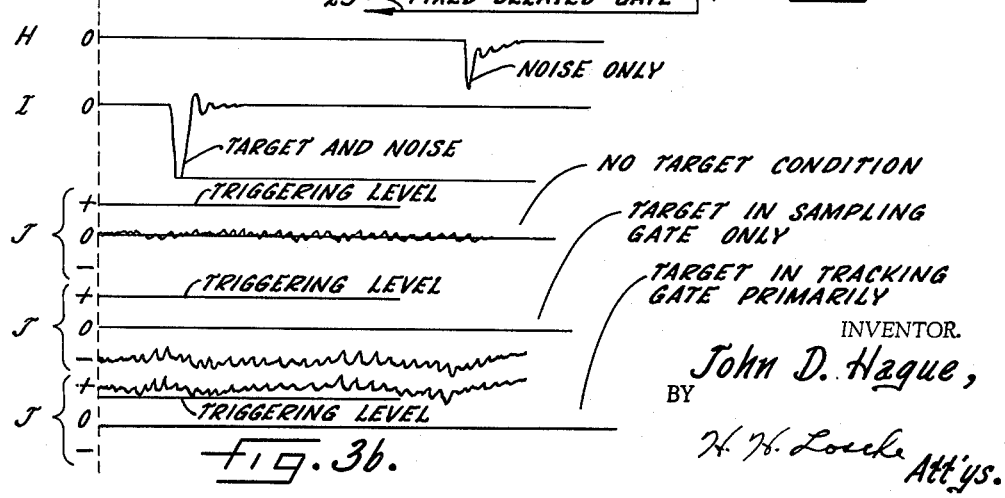
FIGURE 3b is a continuation of the waveforms occurring at points in FIGURE 1 with three example waveforms of target conditions at the output of one of the components in FIGURE 1.

Referring more particularly to FIGURE 2 herein, the pulse time modulator 20, the additional gate 24, and the two cathode or emitter followers 28 and 29 are shown in a more detailed circuit block diagram, like parts being shown with like reference characters. Within the pulse time modulator 20 is an input monostable multivibrator 35 to which is applied the synchronous pulses from the radar at terminal 25. The multivibrator 35 produces two outputs 36 and 37 such as from the two anodes of the multivibrator circuits, as is well understood by those skilled in the art. The multivibrator 35 has the outputs timed so that one output 37, from one anode, has a duration of 100 microseconds, while the output 36, taken from the opposite anode, has a time duration of 233 microseconds. The output 37 is applied through the cathode or emitter follower 29 to produce the output signal A, while the output 36 of multivibrator 35 is applied through the cathode or emitter follower 28 to produce the output signal B. The 100-microsecond and 233-microsecond outputs A and B are positive square waves of which the 233-microsecond output B directly follows the 100-microsecond output A to produce the gating cycle. The output 37 from the multivibrator 35 is also applied through a branch conductor 38 to the clamping triode of a sawtooth generator 39 to produce the output waveform K on the conductor 40. The sawtooth waveform K begins at time T0, T0 being precisely the leading edge of the 100-microsecond wave A, as shown in FIGURE 3a. The conductor 40 is coupled to a bootstrap cathode follower circuit 41, the output of which is through a capacitor 42 to the conductor 40 through a resistor 43 to improve the linearity of the sawtooth generated voltage output K so that the clamped side of the waveform is nearly linear with respect to the time. The sawtooth generator and clamping triode circuit 39 has a B+ voltage applied from terminal 44 through a disconnect diode 45 and the resistor 43. The generator 39 is coupled to one plate of a capacitor 46, the opposite plate of which is coupled to ground. The sawtooth voltage K from conductor 40 is applied to the grid of a pickoff triode 47 which pickoff triode is cathode biased by the range volts being applied by way of conductor 22. Characteristics of the pickoff triode are such that the tube conducts when the grid input rises to within about six volts of the range volts input at the cathode. Since the leading edge of the sawtooth waveform K is in time coincidence T0 with the leading edge of the waveform A, it in turn is in time coincident with the sync pulse applied at 25. The output of the pickoff triode will occur at some time T1 that is exactly proportional to the system range volts output after T0. The output of the pickoff triode 47 is a negative going square wave L that is applied to a first RC differentiator network 48 to produce the waveform M as shown at the output of the differentiator. The differentiator 48 output is applied through an amplifier and inverter circuit 49 and through a second RC differentiator 50 to a blocking oscillator discharge tube 51 that controls a blocking oscillator 52. The amplifier inverter circuit 49 is normally conducting very heavily or near saturation so that when the negative pulse of the signal M is applied thereto the anode current 49 is decreased for a fraction of a second producing the positive signal N at the anode coincident with the leading edge of the pickoff triode output T1. The grid of the amplifier and inverter 49 is held sufficiently positive so that the positive pulse from differentiator 48 does not produce an anode signal and is consequently lost. Initially the blocking oscillator discharge tube 51 is biased below cutoff and on anode current flows, but upon the application of the positive going pulse to the blocking oscillator discharge tube 51, the blocking oscillator will fire for a period of time of about .3 microsecond, for example, producing a positive going square wave pulse P as shown on the output 53 of the blocking oscillator 52. This gating pulse P is applied through a cathode follower 54 to the output conductor 21, this output being similar to the variable gate of waveform E shown in FIGURE 3a. Variable biasing injection may be applied to conductor 21, as illustrated by the block 55, to raise and lower the bias voltage with respect to the amplitude of the gating pulse P to pass a desired amplitude of this gating pulse P.

The additional gate 24 has a fixed delaying network 60 for delaying the sync pulses applied at terminal 25. The delayed sync pulses at 25 are applied to a blocking oscillator 61 which is normally biased below cutoff but is energized in a regenerative manner by each delayed sync pulse to produce a positive going square wave of about .3 microsecond which is applied over its output 62 through a blocking diode 63 and over conductor means 64 to a terminal 65. The output 53 of blocking oscillator 52 is coupled by way of a branch conductor 66 through a blocking diode 67 to the terminal 65. The blocking diodes 63 and 67 permit the delayed pulse from the blocking oscillator 61 and the pulse P from the blocking oscillator 52 to come to the junction 65 without reverse feedback from either of the blocking oscillators. Terminal 65 is coupled through a cathode follower 68 to produce the variable target tracking gating pulse and the fixed delayed gate signal, each of about .3 microsecond, on the output conductor 23, as shown by waveform E in FIGURE 3a, which is applied to the post IF amplifier 15 in FIGURE 1. A variable biasing injection means 69 may be applied to the conductor 23 to vary the biasing voltage relative to the amplitude of the variable target tracking signal and the delayed gate signal or fixed gate signal to pass a desired amplitude of these signals, as shown by these waveforms E in FIGURE 3a. The fixed delay network 60 is constructed and arranged to delay the sync pulse 25 a sufficient interval of time to produce the fixed delay gate on the output 23 which fixed gate is outside the target gating range capabilities of the radar so that only radar receiver noise signals are gated through the post IF amplifier 15 of FIGURE 1 within this fixed gate signal.

It may be seen from the above description that the output of the post IF amplifier 15 will gate through target signals along with inherent receiver noise signals cluttering the target at a range within the variable gate applied over conductor means 23 and will also produce on the output F receiver noise signals gated by the fixed gating signals also coming by way of conductor means 23. Accordingly, the output F of post IF amplifier 15 will have both noise and target signals gated through by the pulse time modulator 20 and noise signals gated through by the additional gate 24. The tracking area gate of 100 microseconds will enable the coincidence detector 27 to detect the target video signals plus its inherent noise signals to produce a direct current voltage proportional to the tracking video voltage amplitude, as shown by I in FIGURE 3b, and the sampling area gate of 233 microseconds will enable the coincidence detector 26 to detect the video receiver noise signals to produce a direct current voltage proportional to the sum video noise amplitude, as shown by H in FIGURE 3b. The differential amplifier, then, will be operative only to amplify real target signals to produce a lockon signal for the tracking loop.

*Operation*

Let it be assumed that the pulse time modulator 20 is producing gating pulses for the radar tracking and lockon loops to produce the 100-microsecond and 233-microsecond square wave gating pulses A and B in this sequence of a gating cycle. Let it further be assumed that a target is illuminated by the antenna 12 to produce ungated target signals C and D in the sum and difference channels of the radar tracking circuits. The variable gating pulse of waveform E will search until the target is encountered, as shown by signal F in FIGURE 3a, which target signal plus noise signals will be enabled to pass the post IF amplifier 15 by the application of the variable and fixed gate signals over the conductor 23. At the same time the target signal will be enabled to pass through the post IF amplifier 17 as an error signal G to the tracking unit 32. The tracking area gate A of 100 microseconds will enable the coincidence detector 27 to apply the detected direct current voltage proportional to the target video signal plus its inherent surrounding noise signals I to the differential amplifier 30 while the sampling area gate B of 233 microseconds will enable coincidence detector 26 to pass the detected direct current voltage proportional to the sum video sampled noise signals H to the differential amplifier 30. Since a target is present, the tracking video signal I will be of greater amplitude than the sum video signals H which will cause differential amplifier 30 to amplify the target signal with high gain to cause the differential amplifier output to appear as J signals to the lockon amplifier 31. The lockon signals J applied by way of conductor 32 and the difference signal G applied to the tracking unit 33 will develop the tracking range voltage over the output 22 which is fed back through the conductor means 22 to the pulse time modulator causing tracking voltage to be applied to develop the tracking range gate signal for the post IF amplifier 17 as set forth in the description for FIGURE 2. Even though the gain of the IF amplifiers 15 and 17 may change or there is drift or degradation of the vacuum tubes or other circuit elements in the IF strips due to vibration of controls, or degradation due to age, or any other change of circuit constants which would normally reduce the tracking sense or the tracking capabilities of the radar system, the target signal will not be lost. The target tracking signals with its inherent noise coming from the coincidence detector 27 are automatically and continuously compared in the differential amplifier 30 with the noise signals coming out of the sampling video coincidence detector 26 and when the target tracking video signals plus noise signals I are of greater amplitude than the summed video noise signals H, a lockon signal will be produced and, consequently, cause tracking of the target. In this manner any previously used lockon sensitivity adjustments may be eliminated from the radar system and greater accuracy of target tracking will be accomplished.

While many modifications and changes may be made in the constructional details and features of this invention to adapt it for two-lobe or four-lobe monopulse radars to produce the results and functions coming as a result of the teaching within the spirit and scope of this invention I desire to be limited in my invention only by the scope of the appended claims.

I claim:

1. An automatic lockon circuit for a multilobe monopulse air-to-ground radar tracking loop having sum and difference channels coupled to a target tracking means for developing the sum and difference signals of target echo signals in the antenna lobes to produce target range voltage comprising:
   a variable tracking range gating means coupled to gate each sum and difference channel to pass target signals in receiver noise signal clutter;
   a fixed delay gating means in said sum channel to gate said sum channel at a range beyond the range of any target to gate receiver noise signals therethrough;
   a pair of coincidence detector circuits, each coupled to receive the output of said sum channel variable and delay gates;
   sampling area gating means coupled to each coincidence detector circuit to apply one portion of a gating cycle to one coincidence detector circuit to gate through target and receiver noise signals passed by said tracking range gate detected at a restored direct current voltage proportional to the target and noise signal voltage amplitude and to apply another portion of the gating cycle to the other coincidence detector circuit to gate through receiver noise signals passed by said delay gate at a restored direct current voltage proportional to said noise signal amplitude;
   a differential amplifier coupled to the outputs of said pair of coincidence detector circuits to produce an output lockon signal therefrom upon the occurrence of target and receiver noise signals of greater amplitude than receiver noise signals; and
   a lockon amplifier coupled between said differential amplifier and said target tracking means to apply said lockon signals thereto along with said target difference signals to develop said range voltage whereby changes in circuit parameters will not affect the effectiveness of a target signal.

2. An automatic lockon circuit as set forth in claim 1 wherein
   said variable tracking range gating means includes a pulse time modulator coupled to receive the synchronous pulses of the radar to produce range gating pulses on the output, the output being coupled to gate post intermediate frequency amplifiers in the sum and difference channels.

3. An automatic lockon circuit as set forth in claim 2 wherein
   said fixed delay gate means is coupled to receive the synchronous pulses of the radar and pulses from the pulse time modulator to produce delayed gating pulses applied to the post amplifier in the sum channel.

4. An automatic lockon circuit as set forth in claim 3 wherein
   said sampling area gating means includes a multivibrator circuit in the pulse time modulator having two anode outputs of alternate conduction, each output being coupled through pulse follower elements to produce said sampling area gating pulses of a gating cycle applied to said coincidence detector circuits.

5. An automatic lockon circuit as set forth in claim 4 wherein
   said target range voltage from said target tracking means is coupled to said pulse time modulator to establish the tracking range gating pulses at a time following said synchronous pulses to pass target echo pulses through said post amplifiers in said sum and difference channels.

6. An automatic lockon circuit as set forth in claim 5 wherein
   said pulse time modulator includes a means of developing a linearly rising voltage beginning at a time initiated by the output of said multivibrator used to gate the target signals, and a pickoff triode coupled to the output of said means for developing a linearly rising voltage and to said range voltage output of said target tracking means to produce said tracking range gate signals at a time subsequent to said synchronous pulses at which time target echo pulses may be expected.

7. An automatic lockon circuit as set forth in claim 6 wherein
   said synchronous pulses to said fixed delay gating means are coupled through a fixed delay network to a blocking oscillator, the latter of which develops a pulse delayed the fixed time after occurrence of a synchronous pulse, the blocking oscillator being conducted through a blocking diode to a junction to which is applied a variable tracking pulse from said pulse time modulator, said delayed synchronous pulse and said variable tracking pulse being applied through a cathode follower producing a variable tracking gate and a fixed delay gate output on the cathode of said cathode follower.

8. An automatic lockon circuit for a multilobe monopulse air-to-ground radar tracking loop having sum and difference channels coupled to a target tracking means for developing the sum and difference signals of target echo signals in the antenna lobes to produce target range voltage comprising:
   a sum intermediate frequency amplifier and a post amplifier in series in said sum channel, and a difference intermediate frequency amplifier and a post amplifier in series in said difference channel;
   a pulse time modulator for receiving synchronous pulses from the radar and for developing target tracking range gating pulses on an output coupled to gate said post amplifiers in said sum and difference channels to pass target signals with receiver noise signals;
   a fixed delay gating means coupled to receive said synchronous pulses and target tracking range gating pulses to develop delayed gating pulses on an output coupled to said post amplifier in said sum channel to gate receiver noise signals therethrough at a range exceeding the range of any expected target;
   a pair of coincidence detectors, each coupled to receive the output of the sum channel post amplifier and each having an output;
   a multivibrator in said pulse time modulator triggered by said synchronous pulses and producing an output on each anode circuit to complete a gating cycle of two predetermined sampling area gating pulses, one sampling area gating pulse of each gating cycle being applied to one coincidence detector to detect a restored direct current voltage proportional to the amplitude of said target signals with receiver noise signals for application to said output, and the other sampling area gating pulse of each cycle being applied to the other coincidence detector to detect a restored direct current voltage proportional to the amplitude of said receiver noise signals passed by said delay gating pulses for application to said output;

a differential amplifier having two inputs coupling the output of each of said coincidence detectors to produce an amplified lockon target signal on an output thereof whenever target and receiver noise signals from said one coincidence detector exceed noise signals from said other coincidence detector in amplitude;

a lockon amplifier coupled between the output of said differential amplifier and one input of said target tracking means, the other input of said target tracking means being coupled to receive said difference target signals from the post amplifier in said difference channel to produce range voltage, said range voltage being coupled to said pulse time modulator to vary said target tracking range gating pulse occurence in time after the corresponding synchronous pulse to gate target echo pulses whereby changes in circuit parameters by changes in circuit element constants will not deteriorate from target detection and tracking.

9. An automatic lockon circuit as set forth in claim 8 wherein said multivibrator in said pulse time modulator has the anode output producing said one sampling area gating pulse coupled to a sawtooth generator and a clamp triode, the output therefrom being coupled as one input to a pickoff triode, another input to said pickoff triode being coupled to receive said target range voltage.

10. An automatic lockon circuit as set forth in claim 9 wherein said fixed delay gating means includes a fixed delay network, a blocking oscillator, a blocking diode, and a cathode follower output in series, said synchronous pulses being applied to said fixed delay network to delay each synchronous pulse a fixed time to produce said delayed gating pulses.

No references cited.

CHESTER L. JUSTUS, *Primary Examiner.*

T. H. TUBBESING, *Assistant Examiner.*